Figure 1:
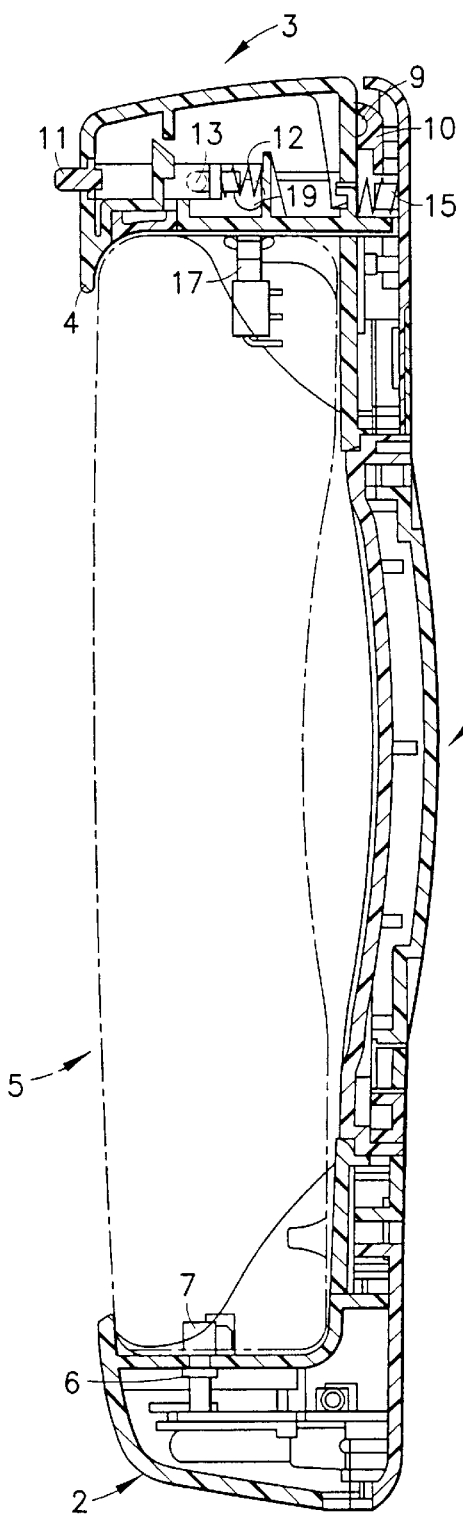

United States Patent
Matchett et al.

[11] Patent Number: 5,907,796
[45] Date of Patent: May 25, 1999

[54] CRADLE FOR AN OPERATING DEVICE

[75] Inventors: Bob Matchett, Mosman; Malcolm Hebblewhite, Cremorne, both of Australia

[73] Assignee: Nokia Mobile Phones Ltd., Salo, Finland

[21] Appl. No.: 08/803,419

[22] Filed: Feb. 20, 1997

[30] Foreign Application Priority Data

Feb. 23, 1996 [FI] Finland ................................. 960831

[51] Int. Cl.⁶ ........................................... H04Q 7/20
[52] U.S. Cl. .......................... 455/90; 455/126; 455/575; 455/345
[58] Field of Search ............................. 455/412, 90, 89, 455/126, 345, 346, 347, 351, 575, 573, 572, 571; 379/426, 445

[56] References Cited

U.S. PATENT DOCUMENTS

| | | | |
|---|---|---|---|
| 3,818,150 | 6/1974 | Kunimine | 379/426 |
| 3,889,071 | 6/1975 | Davis et al. | 179/100 R |
| 4,360,714 | 11/1982 | Hellwig | 379/445 |
| 4,406,928 | 9/1983 | MacKenzie | 179/146 |
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 |
| 5,121,863 | 6/1992 | Kotitalo et al. | 224/42.45 |
| 5,189,698 | 2/1993 | Hakanen | 379/455 |
| 5,333,176 | 7/1994 | Burke et al. | 455/412 |
| 5,555,448 | 9/1996 | Thiede et al. | 455/575 |
| 5,597,102 | 1/1997 | Saarikko et al. | 224/197 |

FOREIGN PATENT DOCUMENTS

| | | |
|---|---|---|
| 0590450 A1 | 4/1994 | European Pat. Off. . |
| 89650 | 6/1993 | Finland . |
| 4008618 A1 | 9/1991 | Germany . |
| 4405506 A1 | 8/1995 | Germany . |
| 2243049 | 10/1991 | United Kingdom . |

*Primary Examiner*—Edward F. Urban
*Assistant Examiner*—Tilahun Gesesse
*Attorney, Agent, or Firm*—Perman & Green, LLP

[57] ABSTRACT

The invention relates to a cradle for an electronic operating device, such as a mobile phone. The cradle has a movable locking member (4) and a connector (16), which moves as a response to movement of the locking member. Thus the connector can be hidden when the locking member is open, so that the connector will not be damaged or get dirty.

11 Claims, 2 Drawing Sheets

CRADLE FOR AN OPERATING DEVICE

TECHNICAL FIELD

The invention relates to electronic devices, such as mobile phones, and it is directed to a cradle having fastening means to retain a device in the cradle. The invention can be used for instance to attach a telephone to the dashboard of a car.

TECHNICAL BACKGROUND

A cradle is often used for a mobile phone so that the telephone can be inserted in the cradle. The cradle can be fastened e.g. to the dashboard of a car. Generally the device has also some kind of locking means, so that the telephone is kept in its place also during movement. The cradle can also contain different connectors, with the aid of which the telephone can be connected for instance to the power supply of the vehicle and to an external telephone antenna of the vehicle or to a microphone or speaker external to the telephone.

For instance from the patent FI 89650 (Nokia Matkapuhelimet Oy) we know a mobile phone cradle, of which there are different models for telephones of different forms. This cradle has fastening means squeezing the telephone from the sides.

DESCRIPTION OF THE INVENTION

General Description

Now a cradle according to claim 1 has been invented. Advantageous embodiments are presented in the other claims.

The cradle according to the invention has a locking member, with which a device inserted in the cradle is retained in its place. Then also the contacts operate reliably. Further the cradle has a connector, which moves as a response to the movement of the locking member. Thus, when the locking member is open, the connector can be hidden, whereby it will not be damaged or get dirty. Further, when the locking member moves into its locking position, the connector can retreat into the operating device against a connector in the operating device, whereby a particularly reliable contact is obtained.

The cradle can be vertical, whereby it corresponds to the normal operating position of a mobile phone. If the depression then is at the base of the cradle the device cannot be easily dislodged by accident.

The locking member can be such that it stays open by itself, whereby the operating device can be inserted in the cradle without opening the locking member. The locking member can function automatically when the operating device is inserted in the cradle, or it can be separately closed. The locking member can be at the opposite end or on the side regarding the depression, and it can be e.g. a catch pivoting about an axis.

The connector can be in the stationary part of the frame or in the locking member. Its path of motion can be linear, whereby the construction is simple (for instance if it is desirable to have the connector and the counterpart to move into each other). The connector can have a linear motion controlled by the movement of the locking member, or an acting means, such as a spring actuated by the locking member, can be connected with the connector.

DRAWINGS

Figure 2:
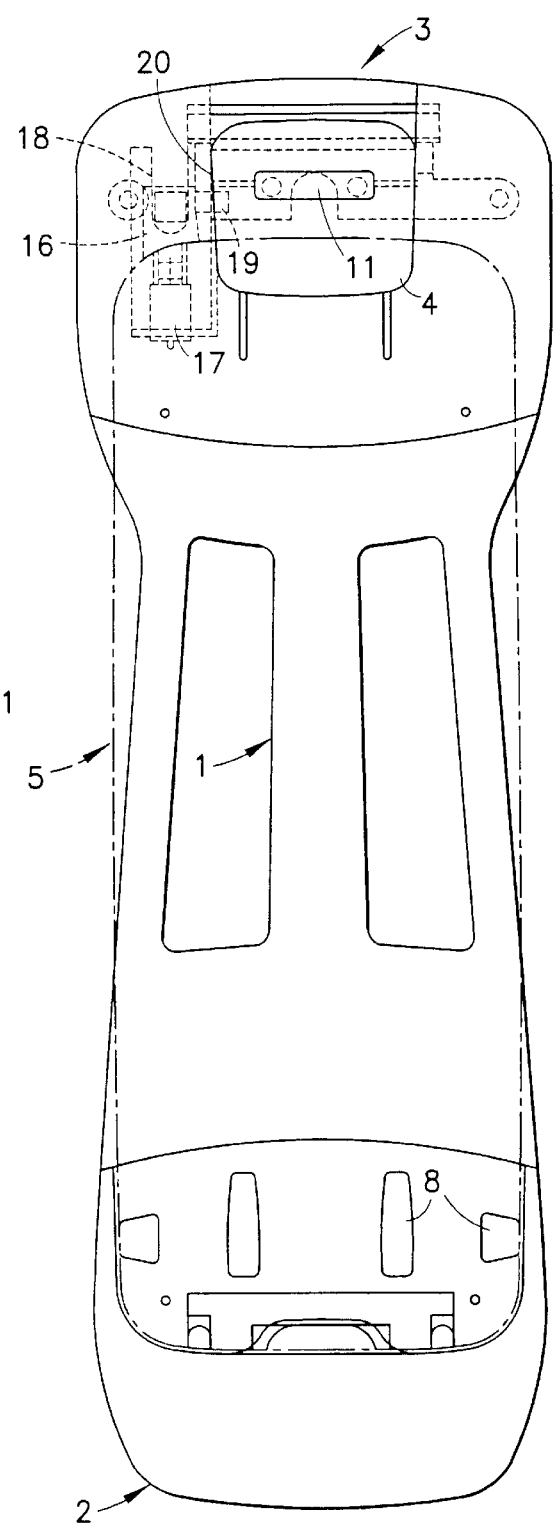
Figure 3:
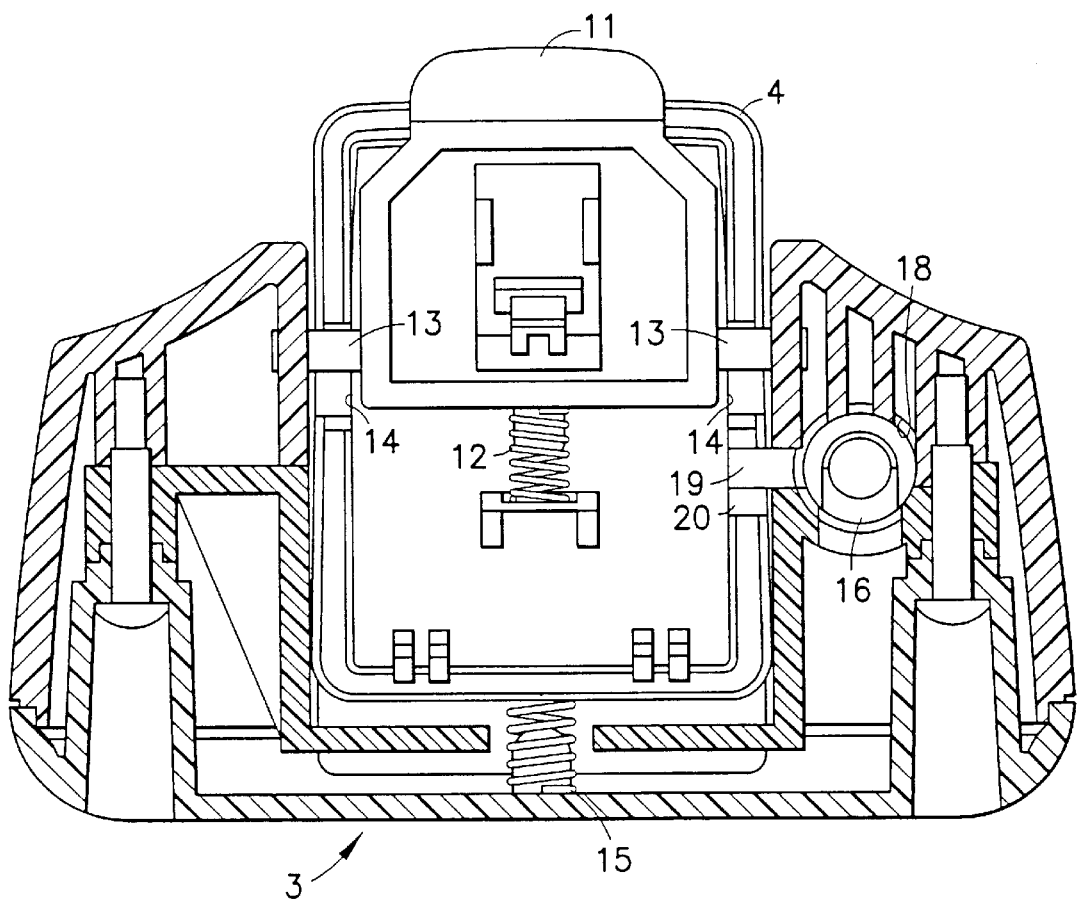

The enclosed drawings form a part of the specific description of the invention. In the drawings FIG. 1 is a side elevation showing the cradle and a telephone inserted in it, FIG. 2 is a view elevation showing the cradle and a telephone to be inserted in it, and FIG. 3 is a top view of the top support of the cradle.

SPECIFIC DESCRIPTION

Main parts of the cradle according to the figures are a back wall 1, a base support 2, a top support 3 and a locking nose 4. The cradle is intended to be fixed with suitable fixing means to the dashboard of a car, for instance.

The base support 2 has a depression, into which the base of a telephone 5 is inserted. At the bottom of the depression there are contact terminals 6, which correspond to terminals 7 in the telephone, and with the aid of which the telephone in the cradle is connected to external circuits, such as a power supply, a microphone and a speaker. On the inner walls of the base support there are elastic paddings 8, which aid to keep the telephone firmly inserted. The top support 3 has a frame which laterally supports the telephone's top end. The locking nose 4 is pivoting attached to the back wall of the top support frame with the aid of a pin 9 and a spacer 10. When the locking nose is in a lowered position the downwards extending supporting extension on the front wall of the nose is in front of the telephone preventing the telephone from moving forwards. Thus the operating device can not be accidentally dislodged. When the locking nose is in its upper position the top end of the telephone can be pressed against the top support or pulled out from it when the base of the telephone at the same time is in the base support 2.

A locking and releasing mechanism is connected with the locking nose 4, with which mechanism the nose can be locked in its lowered position whereby the telephone 5 is locked in the cradle, and with which the nose can be released so that it can pivot to its upper position whereby the telephone can be removed from the cradle or inserted in it. The mechanism has a button 11 projecting from the front wall of the locking nose, and squeezing the button can release the mechanism.

A return spring 12 pushing the button into its front position is connected with the button 11 of the locking and releasing mechanism. On both sides of the button there are sliding pins 13. At the place of the sliding pins the body of the locking nose has a groove 14 in the form of a lying V opening towards the front. When the sliding pins are at the end of the lower branch of the groove the locking nose 4 is in its lowered position, and when the sliding pins are at the end of the upper branch of the groove the locking nose 4 is in its upper position.

Further a lift spring 15 is connected with the locking nose 4, and this spring is located below the pivot pin 9 and pushes the nose forwards from the back wall of the cradle. Thus when the locking nose is in its lower position and its locking is released the nose will automatically pivot to the upper position, and the telephone can be removed as easy as possible.

The construction can also be realized without lifting spring 15 of the locking nose 4, whereby fewer parts are required and the telephone will not be immediately dislodged when the locking is released.

The top support 3 further comprises a connector 16 and the telephone 5 has a corresponding connector 17. Here the connector is particularly a so called RF connector, through which the telephone can be connected to an external antenna. The connector may also serve other functions.

The connector 16 moves according to the movement of the locking nose 4, so that also the connector moves up when the nose moves up. The connector located at the top is hidden within the top support 3, whereby it is well protected against dirt or mechanical damage. Correspondingly, when the nose moves down, the connector moves downwards to rest against the connector 17 of the telephone.

Here the connector 16 moves along linear path. This is realized so that the top support 3 has a vertical motion path 18 for the connector, the connector has on its side towards the locking nose 4 a sliding pin 19, and the locking nose has a guiding groove 20 in the corresponding place. The guiding groove is formed so that the guiding groove forces the connector into vertical movement when the locking nose pivots (i.e., in a side elevation the groove is forward sloping).

We claim:

1. A cradle for an electronic operating device (5) having an end and the cradle having a frame (1, 2, 3) with a space, into which the operating device can be inserted, characterized in that the cradle has a depression (2), into which the end of the operating device is inserted, and a movable locking member (4) having a releasing position, in which the operating device can be inserted into the cradle and removed from the cradle, and a locking position, in which the operating device is locked in the cradle, and that the cradle has a connector (16) mounted on the locking member for movement therewith so that the operating device can have an external electrical connection, the connector moving as a response to movement of the locking member.

2. A cradle according to claim 1, wherein the operating device (5) is in the cradle over the depression.

3. A cradle according to claim 1 having a first end with a depression (2) and a second end with a locking member (4).

4. A cradle according to claim 1, wherein the locking member (4) is a catch pivoting about an axis.

5. A cradle according to claim 4, wherein the locking device (4) has a catch pivoting about a horizontal axis.

6. A cradle according to claim 1, wherein the connector (16) is in the frame of the cradle.

7. A cradle according to claim 1, wherein the connector (16) moves along a linear path.

8. A cradle according to claim 1, wherein the connector (16) contains a sliding pin and the locking member a corresponding guiding groove (20).

9. A cradle according to claim 1, wherein the connector (16) is an RF connector.

10. A cradle according to claim 1, wherein a spring (15) to press the locking member into the releasing position is connected with the locking member (4).

11. A cradle according to claim 1, wherein the connector (16) is within the frame when the locking member is in the releasing position.

* * * * *